United States Patent [19]
Jarvis

[11] Patent Number: 5,732,044
[45] Date of Patent: Mar. 24, 1998

[54] SYSTEM AND METHOD FOR COMPENSATING FOR DOPPLER SHIFTS IN SIGNALS BY DOWNSAMPLING

[75] Inventor: Susan M. Jarvis, Dartmouth, Mass.

[73] Assignee: The United States of America as represented by the Secretary of the Navy, Washington, D.C.

[21] Appl. No.: 715,741

[22] Filed: Sep. 19, 1996

[51] Int. Cl.$^6$ ................................. H04B 11/00
[52] U.S. Cl. .......................... 367/134; 367/904
[58] Field of Search ........................ 367/134, 904

[56] References Cited

U.S. PATENT DOCUMENTS

| | | | |
|---|---|---|---|
| 4,099,249 | 7/1978 | Casasent | 364/822 |
| 4,905,211 | 2/1990 | Mackelburg et al. | 367/134 |
| 5,130,952 | 7/1992 | Fientuch et al. | 367/904 |
| 5,388,080 | 2/1995 | Fientuch et al. | 367/135 |

*Primary Examiner*—Daniel T. Pihulic
*Attorney, Agent, or Firm*—Michael J. McGowan; William F. Eipert; Prithvi C. Lall

[57] ABSTRACT

A signal shift compensation system and method compensates for a shift in a signal, such as a Doppler shift in an acoustic signal. The system includes a signal sampler for oversampling the shifted signal at a fixed oversampling rate to establish an oversampled shifted signal digital value sequence. The fixed sampling rate is greater than the typical sampling rate, such as the Nyquist rate, of the signals by an oversampling factor. The system further includes a compensation downsampler for decimating the oversampled Doppler shifted signal according to a downsampling factor to establish a decimated digital value sequence. The downsampling factor is determined according to the oversampling factor by which the signal is oversampled and an estimate of the (Doppler) shift value. In one example, the downsampling factor is equal to the oversampling factor divided by a Doppler multiplier reflecting the Doppler shift. Each sample in the decimated sequence is given the value of a corresponding sample in the oversampled sequence. Decimation according to the downsampling factor results in a decimated sequence that closely approximates the original unshifted signal.

13 Claims, 5 Drawing Sheets

ORIGINAL SIGNAL SPECTRUM $f_o-2500$    $f_o$    $f_o+2500$

SPECTRUM—0.1% DOPPLER SHIFT $f_o-2502.5$    $f_o$    $f_o+2502.5$

ORIGINAL TIME SERIES 1.0 SEC.

TIME SERIES—0.1% DOPPLER 0.999 SEC.

SYSTEM AND METHOD FOR COMPENSATING FOR DOPPLER SHIFTS IN SIGNALS BY DOWNSAMPLING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention pertains to compensation of Doppler affected signals and in particular, to compensation of Doppler shift in signals by oversampling and downsampling using decimation.

2. Description of the Prior Art

In data transmission between one or more moving vehicles, the Doppler effect causes a shift in a signal between the transmission from a signal source to the reception of the signal in a signal receiver. When either the signal source or the signal receiver are moving with respect to the other, Doppler shift will occur, affecting the frequency and duration of the signals. One particular type of communication in which Doppler shift is a concern is when acoustic signals are transmitted by an underwater moving vehicle. The Doppler effect on the signals, such as acoustic signals, depends on the movement of the transmitter and/or receiver with respect to each other and the medium in which the signals are being transmitted, for example, water.

Systems designed to receive acoustic signals must either be insensitive to Doppler shift or be able to correct or compensate for the Doppler shifting. Typically, the systems that receive and analyze signals, such as underwater acoustic signals, are digital systems which sample the incoming data at a fixed sampling frequency or rate. The digitally sampled signals reflect the shift caused by the Doppler affect as a translation in frequency and therefore a compression or expansion in time or duration of the signal. Some existing systems and methods correct the Doppler shifted signal that has been sampled, for example, by mathematical manipulation of the data sampled at a fixed sampling rate or by adjusting the sampling frequency or rate to compensate for the Doppler affect.

Mathematical techniques for manipulating the sampled data have included time-domain interpolation of samples and discrete Fourier transform methods for non-integer decimation. Such methods have a high numeric complexity and are mathematically intensive. The computational burden of such mathematical methods can be prohibitively large for many real-time applications, for example, in communications systems. The mathematical methods can also create phase distortions or other unwanted and detrimental effects in the data. Such mathematically intensive and complex techniques are disclosed, for example, in U.S. Pat. Nos. 5,130,952 and 5,388,080 to Feintuch, et al., U.S. Pat. No. 4,905,211 to MacKelburg, et al. and in U.S. Pat. No. 4,099,249 to Casasent.

Adjusting the sampling frequency to compensate for the Doppler shifting is limited by the resolution of the clock in a system's analog to digital (A/D) converter. Achieving a fine degree of Doppler compensation often requires a special external clock for control of the analog to digital converter. Although adjusting the sampling frequency to compensate for Doppler shifting may not introduce signal distortion, adding the external clock increases the cost and complexity of the systems' hardware and software.

SUMMARY OF THE INVENTION

Accordingly, one object of the present invention is to provide a signal shift compensation system and method using downsampling by way of non-integer decimation involving less mathematical complexity than existing systems and methods.

Another object of the present invention is to provide a signal shift compensation system and method that is effective for many applications without requiring significant additions of hardware or software.

A further object of the present invention is to provide a signal shift compensation system and method that causes less signal distortion than existing interpolation-based Doppler correction techniques.

According to the present invention, a fixed sampling rate is used to oversample a shifted signal and the oversampled sequence is downsampled using non-integer decimation to remove the shift from the sampled sequence of the shifted signal. The present invention features a signal shift compensation system and method, for compensating at least one shifted signal transmitted in a medium from a signal source and received by a signal receiver. The signal shift compensation system includes a signal sampler, responsive to an oversampling factor value, for determining a fixed oversampling rate based upon the oversampling factor value. The signal sampler is also responsive to the shifted signal, for oversampling the shifted signal at the fixed oversampling rate and for providing an oversampled shifted signal digital value sequence including a number of digital shifted signal sample values.

The signal shift compensation system also includes a compensation downsampler, responsive to a signal shift estimate (e.g., Doppler estimate) value and to the oversampling factor value, for determining a downsampling factor value. The compensation downsampler is also responsive to the oversampled shifted signal digital value sequence and the determined downsampling factor value, for decimating the oversampled shifted signal digital value sequence by the determined downsampling factor value to provide a decimated, corrected (or unshifted) signal sequence. The decimated, corrected signal sequence includes a plurality of signal samples. Each signal sample in the decimated, corrected signal sequence is exactly equal to a determined one of the signal sample values from the oversampled shifted signal digital value sequence.

The determined one of the oversampled shifted signal sample values is determined by multiplying a decimated sequence index value by the determined downsampling factor value to obtain an index value in the oversampled shifted signal digital value sequence. In the preferred embodiment, the determined one of the oversampled shifted sequence is the sample whose index value is closest to the value of the decimated sequence index multiplied by the downsampling factor.

In one preferred embodiment, the signal shift is a Doppler shifted signal. The fixed oversampling rate is the Nyquist sampling rate multiplied by the oversampling factor value. The decimation downsampling rate value is determined from the oversampling factor value divided by a Doppler multiplier based on the signal shift estimate value. According to one embodiment, the system also includes a device for determining the signal shift estimate value and the Doppler multiplier based upon a predetermined reference signal transmitted with the Doppler shifted signal.

3

The method of compensating at least one shifted signal according to the present invention comprises the steps of: oversampling the shifted signal at a fixed oversampling rate based on an oversampling factor value to establish an oversampled shifted signal digital value sequence having a number of digital shifted signal sample values; and decimating the oversampled shifted signal digital value sequence by a downsampling factor value to establish a decimated, corrected (unshifted) digital value sequence including a number of decimated signal samples. The value of any one of the decimated signal samples is equal to a determined one of the digital shifted signal sample values of the oversampled shifted signal digital value sequence.

According the preferred method, the step of oversampling the shifted signal includes oversampling the shifted signal at a fixed oversampling rate that is equivalent to the Nyquist sampling rate multiplied by the oversampling factor value. The step of decimating the oversampled shifted signal digital value sequence includes determining the downsampling factor value according to the oversampling factor value and signal shift estimate value.

According to the preferred method, the step of decimating the oversampled shifted signal digital value sequence includes the steps of initializing a decimated sequence index of the number of decimated signal sample, in the decimated, corrected digital value sequence; determining a corresponding sequence index of a corresponding digital shifted signal sample value in the oversampled shifted signal digital value sequence; and assigning to each decimated corrected signal sample, a value of each corresponding digital shifted signal sample. The corresponding sequence index of the corresponding digital shifted signal sample value is determined for each decimated signal sample by multiplying the decimated sequence index of the decimated signal sample by the downsampling factor value.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
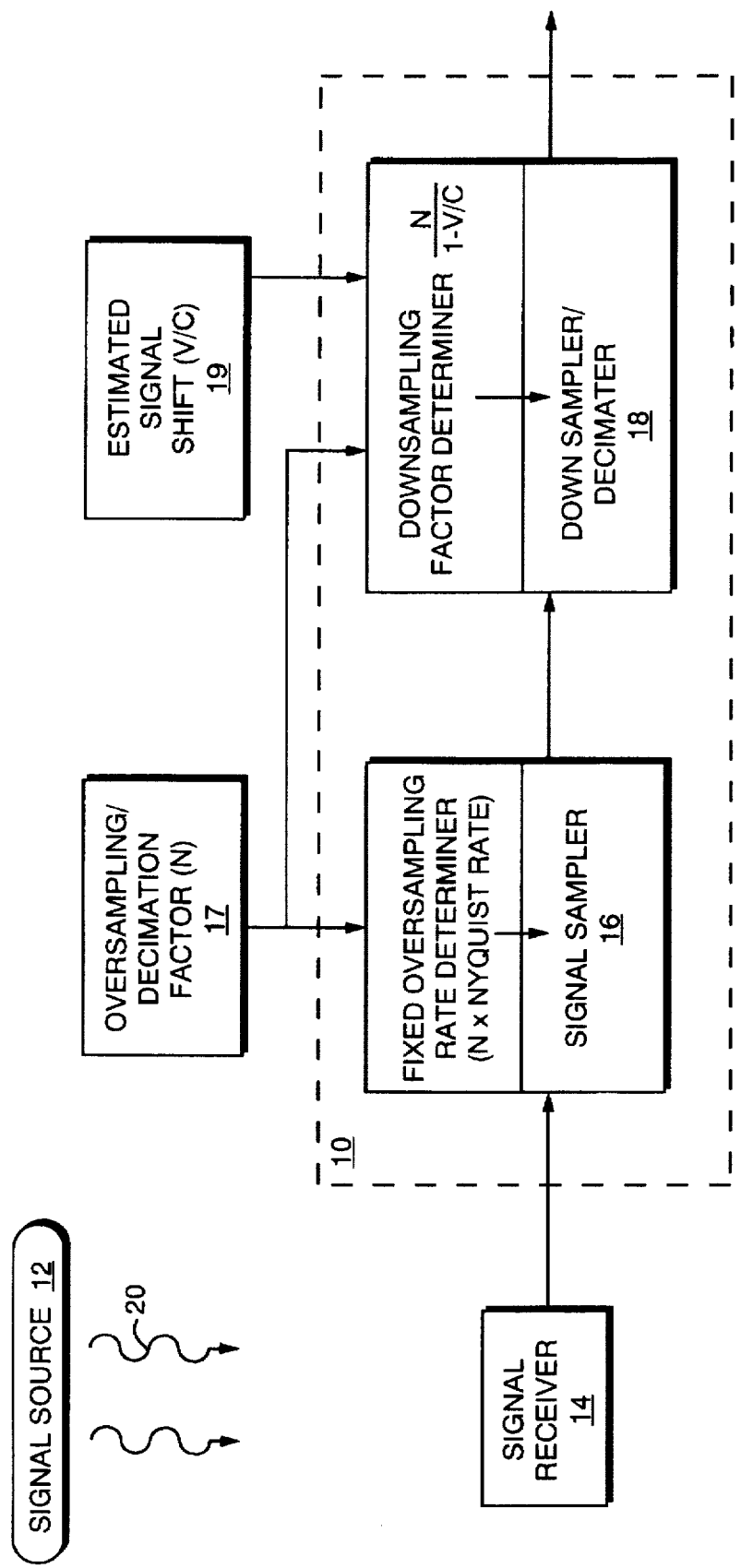
FIG. 1 is a functional block diagram of the signal shift compensation system according to the present invention.

The signal shift compensation system 10, FIG. 1, according to the present invention is useful in and will be explained in conjunction with a signal communications system, such as an underwater acoustic signal communications system in which a signal undergoes Doppler shifting, although this is not a limitation of the present invention. In the communications system one or more signals 20 are transmitted by a signal source 12, such as an underwater vehicle, and are received by a signal receiver 14, such as an underwater sensor located on a surface ship, on an underwater vehicle or suspended in the water column. The relative movement between the signal source 12 and signal receiver 14 results in a Doppler shift in the signals 20 that are received. One possible application of the signal shift compensation system and method is a real-time acoustic telemetry system. The present invention contemplates using the compensation system and method of the present invention to compensate for Doppler shift in any type of transmitted signal that is affected by a Doppler shift and in any similar system in which acoustic signals or any other type of signals are affected by any type of signal shift.

The signal shift compensation system 10 includes a signal sampler 16 which is responsive to the signal receiver 14 and an oversampling/decimation factor (N) provided, for example, by an oversampling/decimation factor input 17. The signal sampler 16 computes or determines a fixed sampling rate based upon the oversampling/decimation factor (N) and digitally samples the shifted analog signal 20 received by the signal receiver 14, according to the fixed oversampling rate. The fixed oversampling rate is preferably determined by multiplying a typical sampling rate by the oversampling/decimation factor (N). In one example, the typical sampling rate is the Nyquist rate (e.g., 5 KHz for the examples shown in FIGS. 2 and 3) and the oversampling/decimation factor (N) is 10. However, the present invention contemplates multiplying any sampling rate by any oversampling/decimation factor (N) to determine the fixed oversampling rate.

The power and information in the shifted analog signal 20 is contained within a number of digitized samples in an oversampled sequence. The number of digitized samples in the oversampled sequence depends on the fixed oversampling rate. The signal shift compensation system 10 further includes a compensation downsampler 18, responsive to the signal sampler 16, to compensate for or remove the signal shift by downsampling the oversampled sequence using a downsampling factor based on the oversampling/decimation factor (N) and a previously estimated signal shift, as will be described in greater detail below. The signal shift compensation system 10 can also include a signal shift estimator 19, for estimating and providing the estimated signal shift, such as an estimated Doppler shift, to the compensation downsampler 18.

The signal shift compensation system 10 and method according to the exemplary embodiment of the present invention is used to compensate for the Doppler shift in a signal, such as an acoustic signal, transmitted through a medium such as water. The Doppler effect causes Doppler shifting to occur in a signal when either the signal source 12 or signal receiver 14, or both, are moving through the medium. A Doppler shifted signal undergoes both a change in signal spectrum and a compression or expansion in time, FIGS. 2A–2D. If $f_o$ is the original frequency of a signal, the Doppler shifted frequency, $f_d$ is given by $$f_d = f_o(1 - v/c) \quad (1)$$

where v=radial component of the signal source's velocity away from the receiver, and c=speed of sound in the given medium. Correspondingly, if $T_o$ is the original duration of the signal, the duration of the signal, $T_d$ after Doppler compression or expansion is given by $$T_d = T_o/(1-v/c). \qquad (2)$$

The term, (1−v/c), will be referred to as the Doppler multiplier, D, wherein v/c equals the previously estimated signal (or Doppler) shift.

Figure 2A:
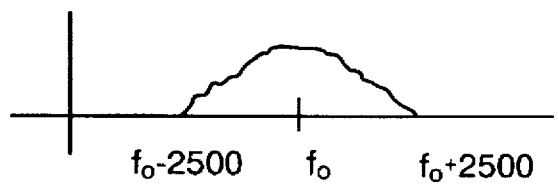
FIGS. 2A and 2B are graphical illustrations of the spectra of an original signal and a Doppler shifted version of the original signal, respectively.
Figure 2B:
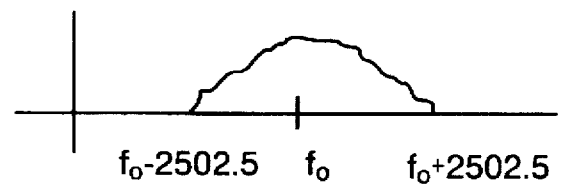
Figure 2C:
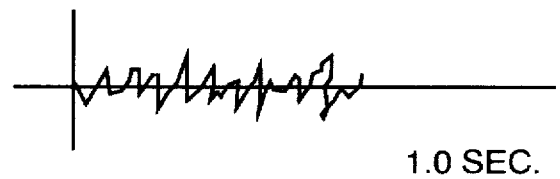
FIGS. 2C and 2D are graphical illustrations of a time series of an original signal and a Doppler shifted version of the original signal, respectively.
Figure 2D:
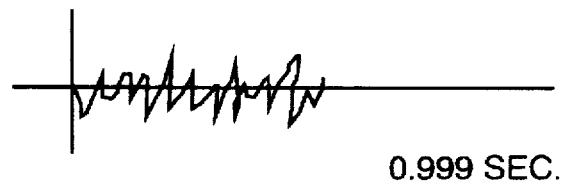

For example, assume that a 1 second long signal with a 2.5 KHz wide spectrum undergoes a +0.1% Doppler shift, i.e. Doppler multiplier, D=1.001, FIGS. 2A and 2C. In this example, the resulting Doppler shifted signal will have a bandwidth of 2502.5 Hz and a compressed signal duration of 0.999 seconds long, FIGS. 2B and 2D. The signal shift compensation system and method 10, according to the present invention, compensates for this translation in spectrum and the compression or expansion in time of a Doppler shifted signal.

If the original signal of 1 second duration was sampled at the Nyquist sampling rate of 5 KHz, the resulting sampled sequence would have 5,000 samples. That same original signal after a +0.1% Doppler shift (D=1.001) would have only 4,995 samples when sampled at the Nyquist rate of 5 KHz. Thus, if the clock of the analog to digital (A/D) converter in the signal receiver 14 were adjusted such that the Doppler shifted signal were sampled at 5,005 Hz (as opposed to 5 KHz), the sampled sequence of the Doppler shifted signal would also contain 5,000 samples within the duration of the signal. One way of compensating for or removing the Doppler shift in a signal is by adjusting the clock and modifying the sampling rate according to the Doppler multiplier. According to the present invention, the fixed oversampling rate is used to oversample the Doppler shifted signal. The oversampled sequence is then downsampled using non-integer decimation to remove the Doppler shift from the sampled sequence of the Doppler shifted signal.

Figure 3A:
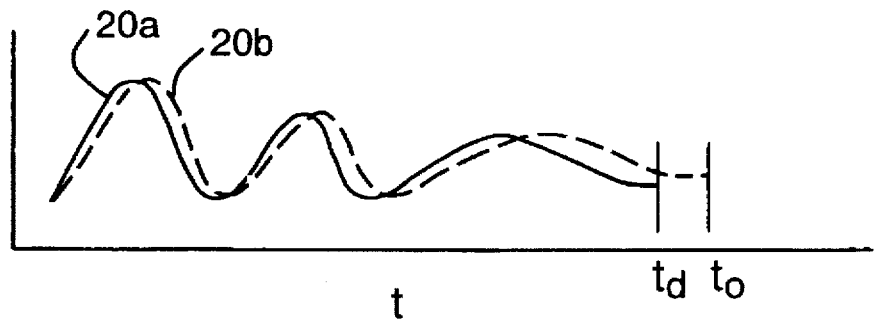
FIG. 3A is a graphical illustration of a signal wave form of an exemplary Doppler shifted signal and original signal.

An exemplary Doppler shifted signal wave form 20a, FIG. 3A, illustrates a Doppler compressed time duration $T_d$ when compared to the duration $T_o$ of the original signal wave form 20b. The original signal wave form 20b represents the original signal as it originated from the signal source whereas the Doppler shifted wave form 20a represents the Doppler shifted signal as it is received at the signal receiver. According to the signal shift compensation method of the present invention, the Doppler shift is removed from the Doppler shifted signal 20a by oversampling and downsampling the Doppler shifted signal 20a using the downsampling factor based upon the oversampling factor (N) and the estimated Doppler shift (v/c).

Figure 3B:
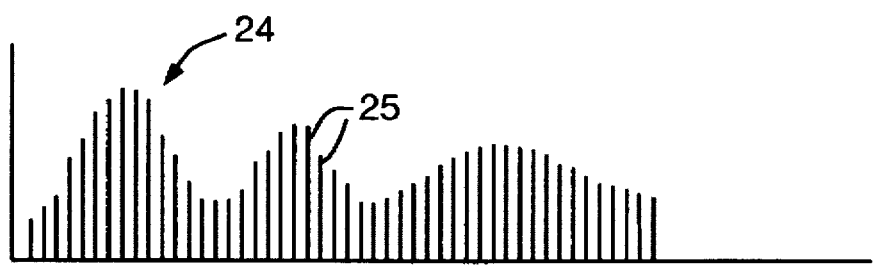
FIG. 3B is a graphical illustration of an oversampled sequence of the exemplary Doppler shifted signal.

The Doppler shifted signal is oversampled at the fixed sampling rate to form an oversampled shifted signal digital value sequence 24, FIG. 3B. The oversampled shifted signal digital value sequence 24 includes a number of digital shifted signal sample values 25 representing the Doppler shifted signal 20a in digital form.

According to the example above, the 1 second original or unaffected signal would contain 50,000 samples if sampled at a fixed oversampling rate of 50 KHz (e.g., the Nyquist rate of 5 KHz multiplied by an oversampling factor of 10). As a result of the +0.1% Doppler shift (D=1.001), the oversampled Doppler shifted signal contains 49, 950 samples when sampled at the fixed sampling rate of 50 KHz. As a result of the Doppler shift, the number of digital shifted signal samples 25 in the oversampled shifted signal digital value sequence 24 of the Doppler shifted signal 20a is either greater or less than the number of samples that would be present in a sampled sequence of the original signal (i.e., unaffected by a signal shifting) at the same sampling rate.

Figure 3C:
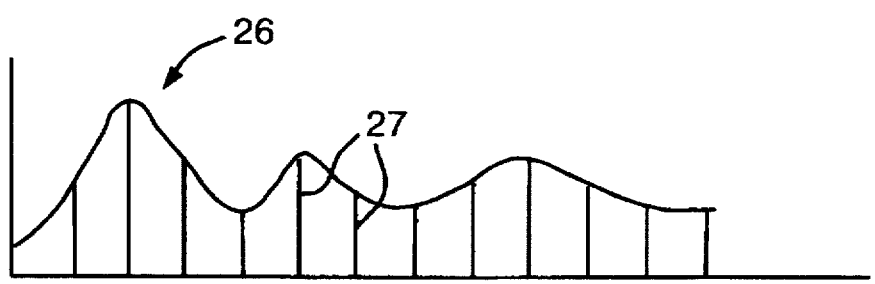
FIG. 3C is a graphical illustration of a corrected decimated sequence of the exemplary Doppler affected signal.

By decimating the oversampled shifted signal digital value sequence 24 of the Doppler shifted signal by the downsampling factor, F, based on the Doppler multiplier, D, and the oversampling factor, N, (e.g., 10), a corrected decimated signal sequence 26, FIG. 3C, having a desired number of decimated shifted signal samples 27 (e.g., 5,000 samples) is established. The downsampling factor, F, is determining according to the following equation:

$$F = N(1-v/c). \qquad (3)$$

For example, if the sampling rate is 50 KHz (or 10 times the Nyquist rate of 5 KHz) and the Doppler multiplier D is 1,001, the resulting downsampling factor F is 9.99, i.e., F=10/D. The number of decimated signal samples 27 in the corrected decimated signal sequence 26 is equal to the number of digital sample values 25 in the oversampled shifted signal digital value sequence 24 divided by the downsampling factor F, e.g., 9.99.

The fixed oversampling rate is preferably determined based upon the desired outcome of the decimated signal sequence. For example, to arrive at a corrected decimated signal sequence 26 having the same number of samples as would the original, unaffected signal if the original signal were sampled at the Nyquist rate of 5 KHz, the oversampling is performed at a fixed oversampling rate that is equivalent the Nyquist rate multiplied by the oversampling factor N. By decimating using a downsampling factor (F) equal to the oversampling factor (N) divided by the Doppler multiplier (D), the resulting decimated signal sequence has the same number of samples as would the original, unaffected signal if sampled at the Nyquist rate.

Each sample 27 in the corrected decimated signal sequence 26 is assigned a value of a corresponding sample 25 in the oversampled shifted signal digital value sequence 24. The decimated signal sequence 26 compensates for the Doppler shifting by using the most evenly spaced samples within the oversampled shifted signal digital value sequence 24, e.g., the most evenly spaced 5,000 samples within the 49,950 samples of the oversampled sequence according to the above example.

One way of determining the corresponding sample 25 in the oversampled sequence 24 for each decimated sample 27 having an index value (or sequence number) in the decimated sequence 26, is by multiplying the decimated sequence index value of the decimated sample 27 by the down sampling factor, F, to determine a corresponding fractional index in the oversampled sequence 24 and using the value of the sample 25 in the oversampled sequence 24 having an index nearest to the corresponding fractional index. For example, the fifth entry in the decimated sequence 26 (i.e., index=5) would correspond to the 50th sample in the oversampled shifted signal digital value sequence 24 (corresponding fractional index=5×9.99= 49.95). Similarly, the 100th entry in the decimated sequence 26 would use sample 999 from the oversampled sequence 24, (100×9.99) and the 5,000th sample in the Doppler compensated sequence 26 would be given the value of sample 49,950 from the oversampled shifted signal sequence 24 (5000×9.99).

Figure 4:
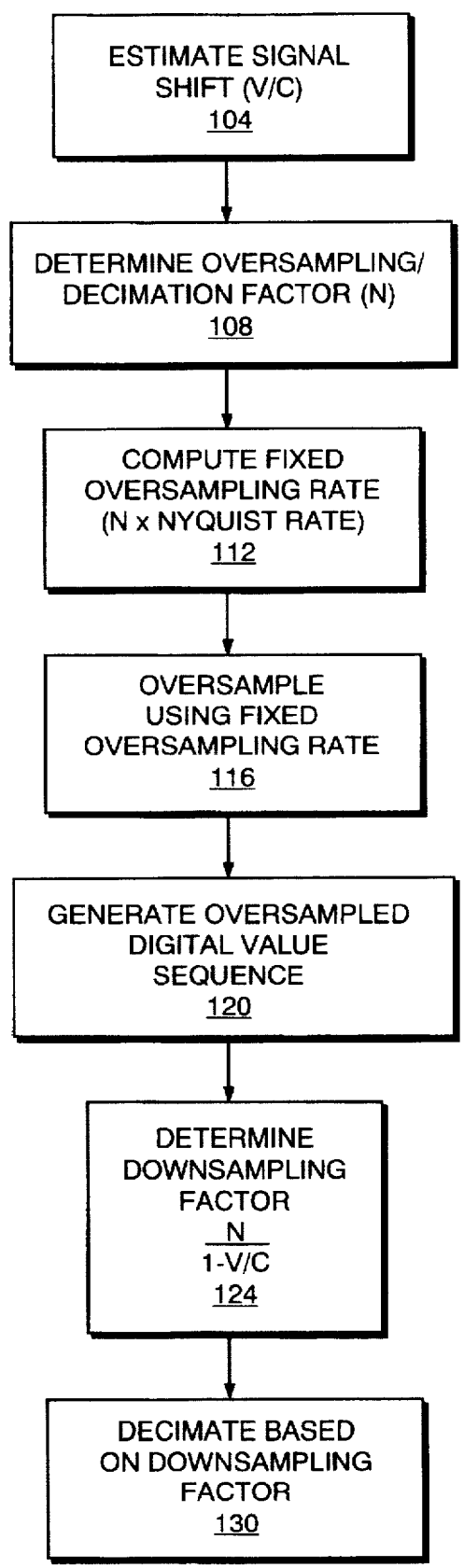
FIG. 4 is a flow chart illustrating the signal shift compensation method according to one embodiment of the present invention.

The signal shift compensation method 100, FIG. 4, includes providing an estimated signal shift, such as an estimated Doppler shift (v/c), step 104, for example, using a known reference signal and discrete Fourier analysis methods known to those skilled in the art. The oversampling/decimation factor (N) is also provided, step 108, and preferably depends on the capabilities of the system and the desired accuracy of the compensation. The fixed oversampling rate is then computed by multiplying the oversampling/decimation factor (N) by a typical sampling rate, such as the Nyquist rate, step 112. The shifted signal is oversampled using the fixed oversampling rate, step 116, and in step 120 an oversampled digital value sequence having a number of samples based upon the fixed oversampling rate and the duration of the signal is generated. The downsampling factor F is determined, step 124, by dividing the oversampling/decimation factor (N) by the Doppler multiplier (D). The oversampled digital value sequence is then decimated using the downsampling factor (F), step 130, to generate a decimated sequence having a number of samples corresponding to selected samples in the oversampled digital value sequence.

Figure 5:
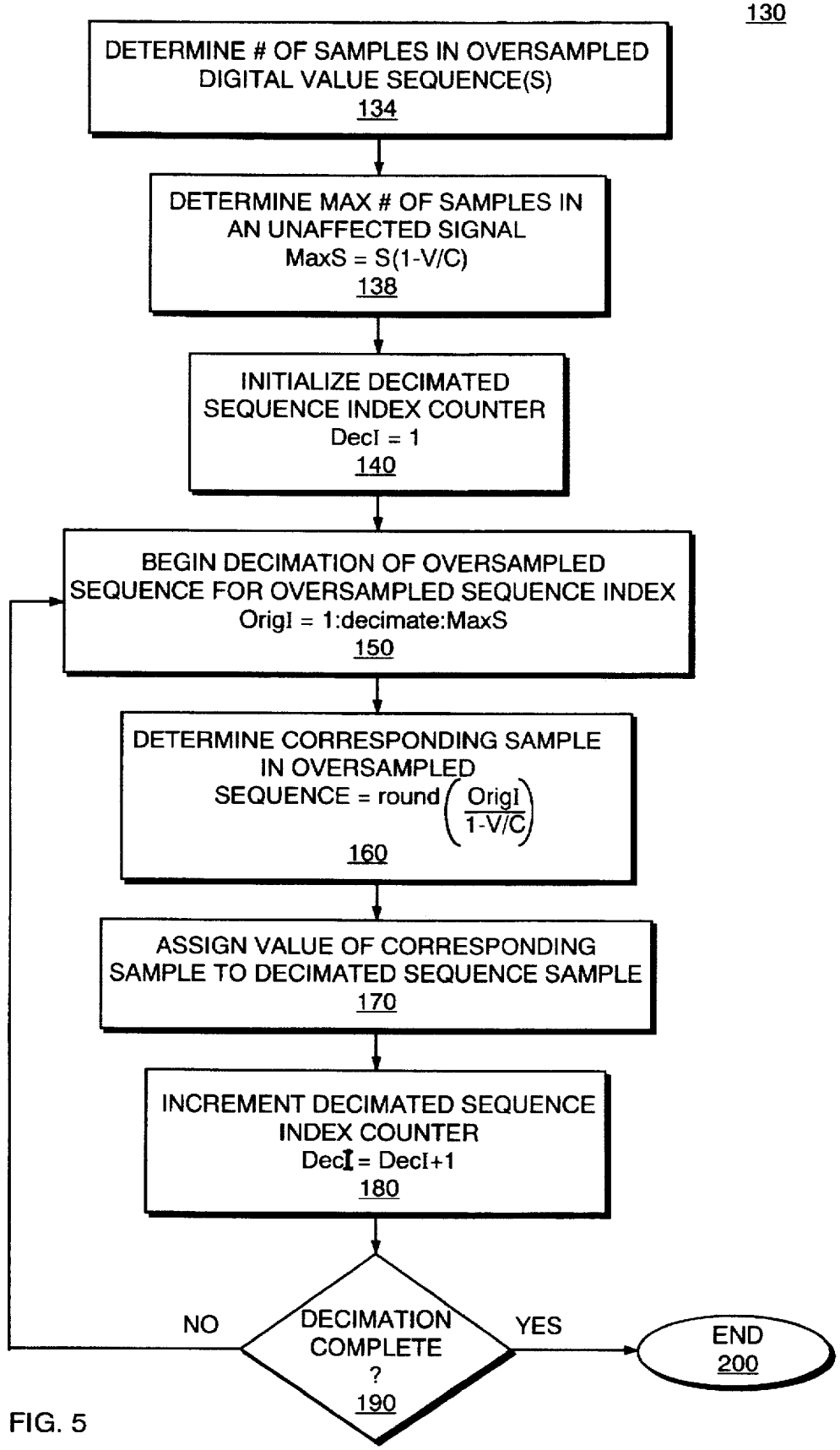
FIG. 5 is a flow chart illustrating the decimation process according to one embodiment of the present invention.

In one example, the decimation process 130, FIG. 5, begins by determining the number of samples (S) that are in the oversampled digital value sequence, step 134. Next, the maximum number of samples (MaxS) that would be in an unaffected signal oversampled sequence are determined, step 138, for example, the number of samples if the original signal not affected by the Doppler shift were sampled at the fixed oversampling rate (e.g.) S (1−v/c)). A decimated sequence index counter is initialized (DecI=1), step 140, and the decimation of the oversampled digital value sequence is begun, step 150.

The decimation process steps through the oversampled sequence samples according to the oversampling factor (N) and assigns values of corresponding samples in the oversampled sequence to each sample in the decimated sequence. For each sample in the decimated sequence, the corresponding sample in the oversampled sequence is determined by dividing the oversampled sequence index by the Doppler multiplier D and rounding to find the nearest sample in the oversampled sequence, step 160. The value of the corresponding sample in the oversampled sequence is then assigned to the decimated sequence sample, step 170, and the decimated sequence index counter is incremented, step 180.

The decimation process continues to determine a corresponding sample in the oversampled sequence for each sample in the decimated sequence and assigning the value of that sample in the oversampled sequence to the sample in the decimated sequence until decimation of the oversampled sequence is completed, step 190, and the decimation process ends, step 200.

One way of implementing the signal shift compensation system and method according to the present invention is in the form of software. In one example, the psuedo code for the decimation process used to compensate for Doppler shift would appear as shown in Table 1.

TABLE 1

```
/* Let over_smpl_Dop be the oversample Doppler shifted signal and
/* let dec_sec be the resultant Doppler compensated decimated sequence
    max_sample = 50000;    /* max. number of samples in original, un-Doppler
                            /* shifted signal
    decimate = 10;          /* desired oversampling factor
    D = 1.001;              /* Doppler multiplier
    dec_Dop_indx = 1;       /* initialize index for decimated Doppler sequence
    for orig_indx = 1: decimate: max_samples
        near_smpl = round (orig_indx/D);    /* find index of nearest sample in the
                                            /* oversampled Doppler shifted signal
        dec_seq (dec_Dop_indx) = over_smpl_Dop(near_smpl);   /* assign value of
                                                             /* nearest sample to
                                                             /* decimated sequence
        dec_Dop_indx = dec_Dop_indx + 1;
    end;
```

The signal shift compensation system and method according to the present invention, preferably uses a fixed oversampling rate that is much greater than the sampling rate that would be used if sampling a non-Doppler affected signal. For example, if the Nyquist rate would typically be used to sample the signal, the decimated sequence should be equivalent to the original sequence sampled at the Nyquist rate and the oversampling should be at a fixed oversampling rate which is a multiple of the Nyquist rate. At greater fixed sampling rates, the adjacent samples in the oversampled sequence will be closer in value, and the corresponding values assigned to the samples in the decimated sequence will be a better approximation of the actual value at the fractional index. The oversampling factor used in the examples described herein is a factor of 10 but the present invention contemplates other possible ratios depending on the required accuracy of the application.

Accordingly, the present invention provides a signal shift compensating system and method which is relatively low in mathematical complexity. The signal shift compensating system and method using non-integer decimation also results in signal shift compensation with less signal distortion than existing Doppler compensating techniques. The signal shift compensating system and method can also be easily implemented in many applications without requiring significant additional hardware and/or software.

Many modifications of the presently disclosed invention will become apparent to those of skill in the art without departing from the scope of the appended claims.

What is claimed is:

1. A system for compensating for signal shift in at least one shifted signal emitted in a medium from a signal source and received by a signal receiver comprising:

a signal sampler, responsive to an oversampling factor value and to said at least one shifted signal, for oversampling said at least one shifted signal at a fixed oversampling rate to generate an oversampled shifted signal digital value sequence including a number of digital shifted signal sample values; and a compensation downsampler, responsive to a signal shift estimate value and to said oversampling factor value and to said oversampled shifted signal digital value sequence, for decimating said oversampled shifted signal digital value sequence by a downsampling factor value to generate a corrected decimated signal sequence, said corrected decimated signal sequence including a plurality of decimated signal samples.

2. The system of claim 1 wherein each one of said plurality of decimated signal samples is equal to a corresponding one of said number of digital shifted signal sample values, said corresponding one of said number of digital shifted signal sample values being determined by multiplying a decimated signal sequence index value by said downsampling factor value to obtain an index value in said oversampled shifted signal digital value sequence of said corresponding one of said number of digital shifted signal values.

3. The system of claim 2 wherein said signal shift includes a Doppler shift in said at least one shifted signal.

4. The system of claim 2 wherein said corresponding one of said predetermined number of digital sifted signal sample values is a digital shifted signal sample value having an index value in said oversampled shifted signal digital value sequence nearest to said decimated sequence index value multiplied by said downsampling factor value.

5. The system of claim 2 wherein said fixed oversampling rate is greater than the Nyquist sampling rate for an unshifted signal, said unshifted signal being said at least one shifted signal without said signal shift.

6. The system of claim 2 wherein said fixed oversampling rate is greater than the Nyquist sampling rate of said at least one shifted signal without said signal shift, by said oversampling factor value.

7. The system of claim 2 wherein said fixed oversampling rate is a function of said oversampling factor value and said downsampling factor value is determined from said signal shift estimate value and said oversampling factor value.

8. The system of claim 1 wherein:

said fixed oversampling rate is equal to the Nyquist sampling rate multiplied by said oversampling factor value (N); and said downsampling factor value (F) is determined according to the following equation:

F=N/D where D is a Doppler multiplier according to the equation:

D=(1-v/c)

where v is a radial component of a velocity of said signal source with respect to said signal receiver and c is the speed of sound in the medium.

9. The system of claim 8 further including a means for determining said Doppler multiplier (D) based upon a predetermined reference signal transmitted with said at least one Doppler shifted signal.

10. The system of claim 8 wherein said oversampling factor value (N) is 10.

11. A method of compensating for signal shift in at least one shifted signal emitted in a medium from a signal source comprising the steps of:

oversampling said at least one shifted signal at a fixed sampling rate based on an oversampling factor value to establish an oversampled shifted signal digital value sequence having a number of digital shifted signal sample values; and decimating said at least one oversampled shifted signal digital value sequence by a downsampling factor value, based on said oversampling factor value and a signal shift estimate value, to establish a decimated digital value sequence including a number of decimated signal samples, wherein a value of any one of said decimated signal samples is equal to a determined one of said digital shifted signal sample values of said oversampled shifted signal digital value sequence.

12. The method of claim 11, wherein said step of decimating said at least one oversampled shifted signal digital value sequence by a downsampling factor value includes the steps of:

initializing a decimated sequence index of said number of decimated signal samples in said decimated digital value sequence;

determining a corresponding sequence index of a corresponding digital shifted signal sample value in said oversampled shifted signal digital value sequence, wherein said corresponding sequence index of said corresponding digital shifted signal sample is determined for each decimated signal sample in said decimated digital value sequence by multiplying said decimated sequence index of said each decimated signal sample in said decimated digital value sequence by said downsampling factor value; and assigning, to said each decimated signal sample, a value of each said corresponding digital shifted signal sample value.

13. The method of claim 11, wherein said step of oversampling said at least one shifted signal includes oversampling said at least one shifted signal at a fixed oversampling rate that is a multiple of Nyquist rate by said oversampling factor value (N); and said step of decimating said at least one shifted oversampled sequence includes determining said downsampling factor value (F) according to the following equation:

F=N/D where D is a Doppler multiplier determined according to the equation:

D=(1-v/c)

where v is a radial component of a velocity of said signal source with respect to said signal receiver and c is the speed of sound in the medium.

* * * * *